United States Patent
Henry

(10) Patent No.: US 9,374,944 B2
(45) Date of Patent: Jun. 28, 2016

(54) FLUID LINE CONNECTION FOR AN AGRICULTURAL AIR SEEDER

(71) Applicant: CNH America, LLC, New Holland, PA (US)

(72) Inventor: James W. Henry, Saskatoon (CA)

(73) Assignee: CNH Industrial Canada, Ltd., Saskatoon, Saskatchewan (CA)

(*) Notice: Subject to any disclaimer, the term of this patent is extended or adjusted under 35 U.S.C. 154(b) by 112 days.

(21) Appl. No.: 13/750,437

(22) Filed: Jan. 25, 2013

(65) Prior Publication Data

US 2014/0208999 A1 Jul. 31, 2014

(51) Int. Cl.
*A01C 7/08* (2006.01)
*F16L 37/252* (2006.01)
*F16L 17/02* (2006.01)

(52) U.S. Cl.
CPC ............... *A01C 7/081* (2013.01); *F16L 17/02* (2013.01); *F16L 37/252* (2013.01)

(58) Field of Classification Search
CPC ............ A01C 7/081; A01C 7/08; A01C 7/00; F16L 37/252; F16L 37/244; F16L 37/24; F16L 37/00; F16L 17/02; F16L 17/00
USPC .......... 111/170, 174–176, 200; 222/195, 630; 406/141, 142, 143, 146, 120, 124, 181, 406/41
See application file for complete search history.

(56) References Cited

U.S. PATENT DOCUMENTS

| 6,725,788 B2 | 4/2004 | McCartney et al. |
| 6,782,835 B2* | 8/2004 | Lee et al. ............... 111/174 |
| 6,892,909 B1 | 5/2005 | Hebert et al. |
| 2006/0191928 A1 | 8/2006 | Ptacek et al. |
| 2010/0101469 A1 | 4/2010 | Landphair et al. |
| 2011/0102168 A1 | 5/2011 | Mariman et al. |
| 2011/0311322 A1 | 12/2011 | Jost et al. |

FOREIGN PATENT DOCUMENTS

| DE | 297 01 531 | 6/1997 |
| EP | 0 160 370 | 3/1985 |

* cited by examiner

*Primary Examiner* — Christopher J Novosad
(74) *Attorney, Agent, or Firm* — Rebecca L. Henkel

(57) ABSTRACT

An agricultural air seeder includes a tilling implement having a plurality of air lines. An air cart is coupled with the tilling implement, and includes a pneumatic distribution system with a plurality of air lines. A plurality of air line connections respectively interconnect between an air line associated with the tilling implement and an air line associated with the air cart. Each air line connection has a female connector and a male connector. Each female connector has an inside diameter with an annular groove, and a seal disposed within the annular groove. The male connector is positioned within the female connector and sealed with the seal.

8 Claims, 2 Drawing Sheets

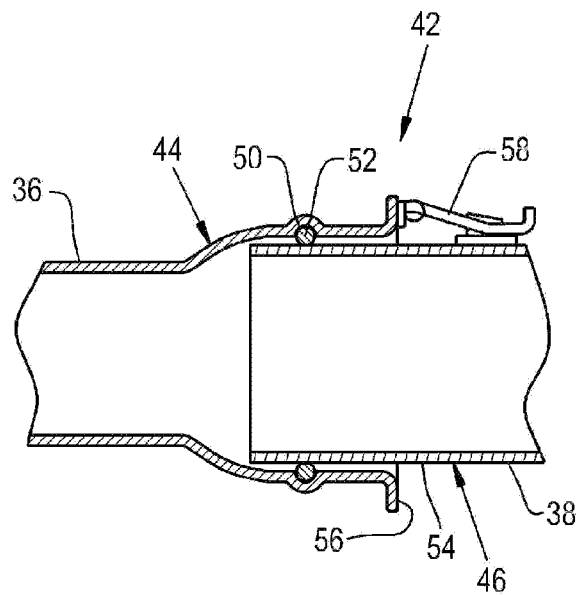
Fig. 2
Fig. 3
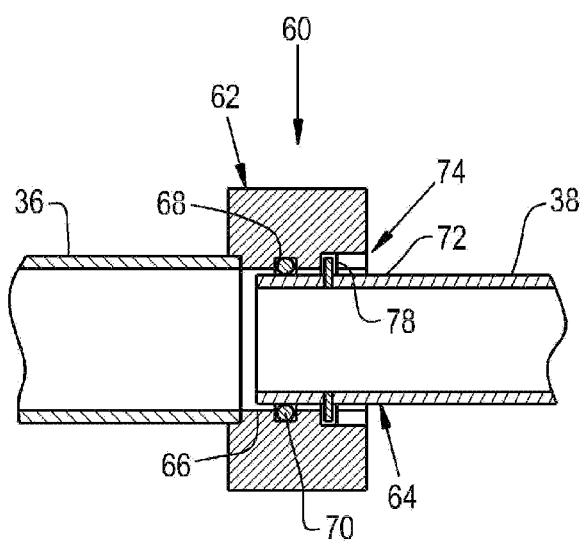
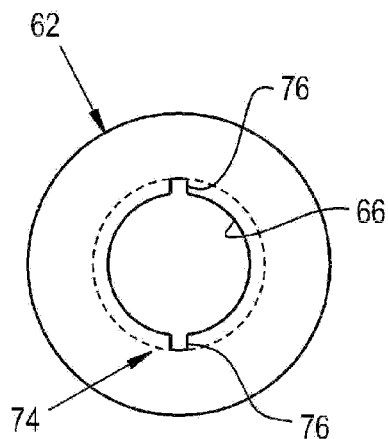
Fig. 4
Fig. 5

FLUID LINE CONNECTION FOR AN AGRICULTURAL AIR SEEDER

BACKGROUND OF THE INVENTION

1. Field of the Invention

The present invention relates to agricultural air seeders, and, more particularly, to fluid line connections used with such air seeders.

2. Description of the Related Art

Air seeders are commonly towed by a traction unit, e.g., an agricultural tractor, to apply a material such as seed, fertilizer and/or herbicide to a field. An air seeder has as a primary component a wheeled air cart which includes one or more frame-mounted tanks for holding material. In the case of multiple tanks, the tanks can be separate tanks, or a single tank with internal compartments. The air cart is typically towed in combination with a tilling implement, such as an air drill, one behind the other, to place the seed and fertilizer under the surface of the soil. Air seeders generally include a metering system for dispensing material from the tanks and a pneumatic distribution system for delivering the material from the tanks to the soil. A centrifugal fan provides at least one airstream which flows through the pneumatic distribution system. Material is first introduced to the air stream by the metering system at a primary distribution manifold located below the metering system. The tanks of the air seeders are formed with bottom surfaces that slope downward at an angle of repose for the granular material toward the metering system. Gravity, in combination with the vibrations and movement of the air seeder, act to move the granular material from the perimeter of the tank toward the metering system located at the center of the tank. Material is carried by the air stream through distribution lines to a series of secondary distribution manifolds, which in turn distribute the material through distribution lines to seed boots mounted behind ground openers on the tilling implement so that the product may be evenly delivered to the ground which is tilled by the tilling implement.

For initial hookup of the air seeder, the traction unit is typically backed up to and coupled with the tilling implement, which in turn is backed up to and coupled with the air cart (e.g., by using respective hitch pins or the like, and assuming that the air cart is behind rather than in front of the air drill). All necessary fluid line and electrical connections are then connected between the traction unit, tilling implement and air cart. For example, it may be necessary to connect hydraulic lines, air lines, electrical power lines and/or electrical data lines between the pieces of equipment. With regard to the air lines, it will be appreciated that it is desirable to provide connections which are quick and easy to connect, while at the same time providing an effective fluid seal. With air seeders becoming ever larger, the number of air lines and thus the number of air line connections between the tilling implement and the air cart correspondingly increases, making the need for quick and easy air line connections even more important. Larger air seeders result in more air lines and more air line connections, requiring that the pneumatic distribution system run under a higher operating pressure. This higher operating pressure also mandates that the fluid line connections must be effectively sealed to prevent excess system air leakage.

What is needed in the art is an air seeder with air line connections which are quick and easy to connect, while providing an effective fluid seal.

SUMMARY OF THE INVENTION

The present invention provides a fluid line connection for an air seeder, in which a fluid line connection includes a female connector associated with one fluid line and a male connector associated with another mating fluid line. The female connector has an inside diameter (ID) with an annular groove and a seal within the annular groove. The male connector is inserted into and sealed with the female connector.

The invention in one form is directed to an agricultural air seeder, including a tilling implement having a plurality of air lines. An air cart is coupled with the tilling implement, and includes a pneumatic distribution system with a plurality of air lines. A plurality of air line connections respectively interconnect between an air line associated with the tilling implement and an air line associated with the air cart. Each air line connection has a female connector and a male connector. Each female connector has an ID with an annular groove, and a seal disposed within the annular groove. The male connector is positioned within the female connector and sealed with the seal.

The invention in another form is directed to a fluid line connection for a pneumatic distribution system in an agricultural air seeder. The fluid line connection includes a female connector having an ID with an annular groove, and a seal disposed within the annular groove. A male connector is positioned within the female connector and has an outside diameter (OD) sealed with the seal. A latch is connected to each of the female connector and the male connector.

The invention in yet another form is directed to a method of coupling fluid lines together in an agricultural air seeder, including the steps of: providing a female connector attached to a fluid line, the female connector having an ID with an annular groove, and a seal disposed within the annular groove; inserting a male connector associated with another fluid line into the female connector, such that an OD of the male connector is sealed with the seal; and latching the male connector to the female connector.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein:

FIG. 2 is a side sectional view of an embodiment of a fluid line connection of the present invention;

FIG. 3 is a cross-sectional view of another embodiment of a seal which may be used with the fluid line connection of the present invention;

FIG. 4 is a side sectional view of another embodiment of a fluid line connection of the present invention; and FIG. 5 is an end view of the female connector shown in FIG. 4.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1:
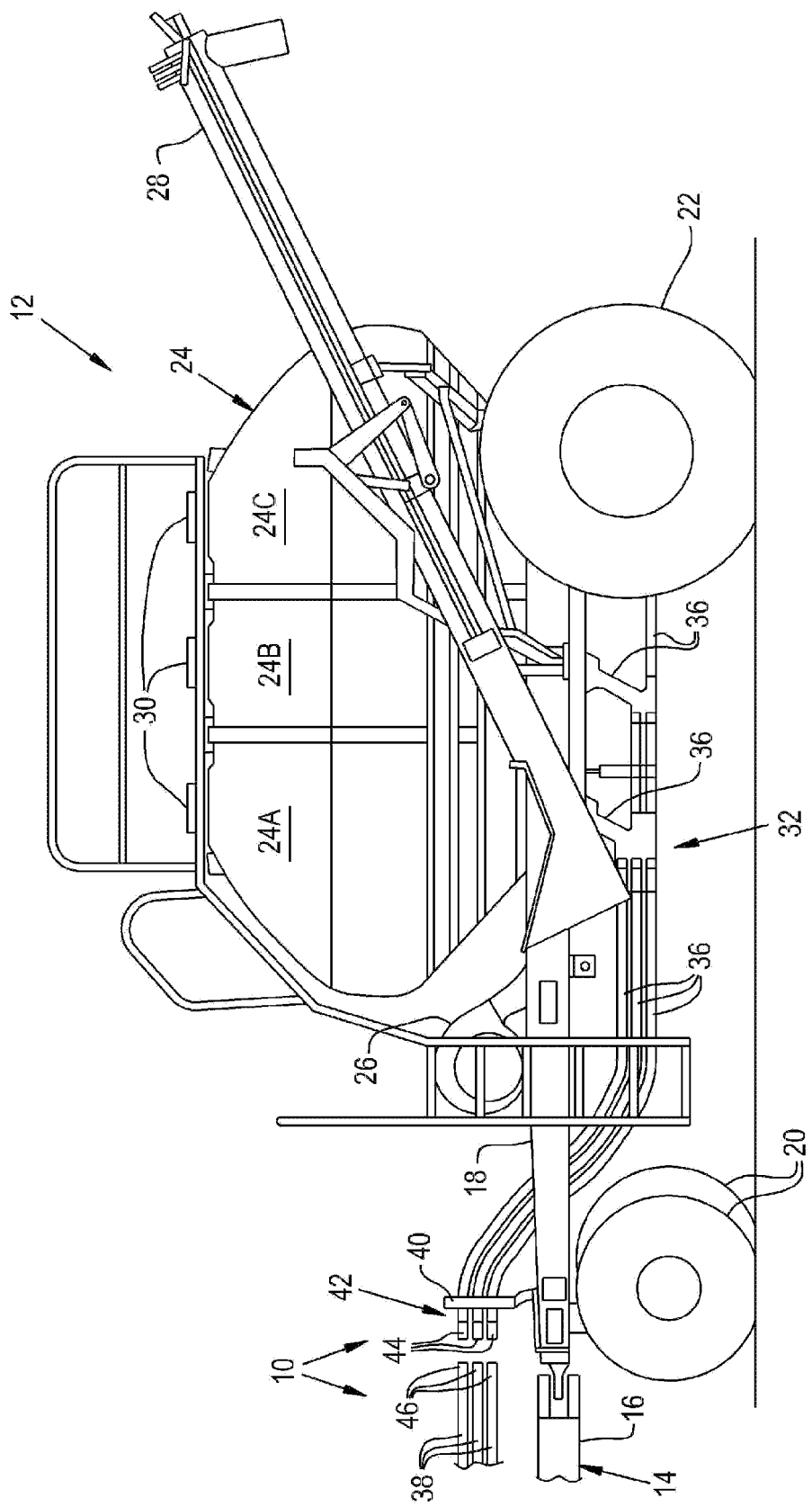
FIG. 1 is a partial, side schematic illustration of an embodiment of an air seeder of the present invention.

Referring now to the drawings, and more particularly to FIG. 1, there is shown a partial, side schematic illustration of an embodiment of an air seeder 10 of the present invention. Air seeder 10 generally includes an air cart 12 which is towed by a tilling implement 14 (with only a portion of the rear hitch 16 of tilling implement 14 showing in FIG. 1). In the embodiment shown, tilling implement 14 is in the form of an air drill, but can be differently configured, depending upon the application. For example, tilling implement 14 could be in the form of a planter and air cart 12 could be used to refill mini-hoppers onboard the planter. Air cart 12 may also be configured with a rear hitch (not shown) allowing air cart 12 to be towed in front of, rather than behind, tilling implement 14.

Air cart 12 generally includes a frame 18 which carries steerable front wheels 20, rear wheels 22, tank 24, blower 26 and auger 28. Tank 24 is illustrated as a multi-compartment tank with internal divider walls (not shown) separating the compartments. In the embodiment shown, tank 24 has three compartments 24A, 24B and 24C with each compartment containing a material to be deposited into the soil (such as seed, fertilizer, herbicide and/or insecticide). Each compartment 24A, 24B and 24C has a top hatch 30 allowing loading of the material therein.

Air cart 12 includes a pneumatic distribution system 32 for delivering the air-entrained material to the trenches in the soil formed by tilling implement 14. Pneumatic distribution system 32 includes a metering system (not specifically shown), blower 26 and a plurality of air lines 36. In the illustrated embodiment, blower 26 is a centrifugal blower, but can be differently configured. Further, in the illustrated embodiment, three primary air lines 36 are shown, one from each tank compartment 24A, 24B and 24C. However, the number of air lines 36 can vary, depending on the application.

Air lines 36 extend to and terminate at a convenient location for coupling with air lines 38 associated with tilling implement 14. In the embodiment shown, air lines 36 are supported at the forward end of air cart 12 with a support yoke 40. Each air line 36 terminates at a respective fluid (air) line connection 42. In the embodiment shown, each fluid line connection 42 includes a female connector 44 associated with each air line 36 and a male connector 46 associated with an end of each air line 38. However, the orientation of each fluid line connection 42 may be reversed such that each female connector 44 is associated with a corresponding air line 38 of tilling implement 14. Each male connector 46 is received within and fluidly seals with a respective female connector 44, as described in more detail below.

Referring now to FIG. 2, female connector 44 and male connector 46 are shown in a coupled state. Female connector 44 has an ID 48 with an annular groove 50. Annular groove 50 is preferably formed in ID 48 using a rolling process, which is less expensive, but could also be formed using a different manufacturing process, such as machining, etc. A seal 52 is disposed within annular groove 50. Seal 52 is in the form of an elastomeric O-ring seal in the embodiment shown in FIG. 2. However, seal 52 could be configured with a different cross-sectional shape, such as a U-shaped cross-sectional shape, or a V-shaped cross-sectional shape (FIG. 3).

Male connector 46 has an OD 54 which is sealed with seal 52 when inserted within female connector 44. In the illustrated embodiment, male connector 46 is simply an end of an air line 38 associated with tilling implement 14. However, male connector 46 can be a separate, discrete part which is attached to the end of an air line 38. For example, air line 38 can be formed from an elastomeric or plastic material which is attached to a steel tube defining male connector 46. Moreover, in the embodiment shown, male connector 46 has a larger diameter than air line 36. However, male connector 46 (and air line 38) may have the same diameter as, or even a smaller diameter than, air line 36.

To assist with easy insertion of male connector 46, female connector 44 may also include a bell shaped entry end 56 with a predetermined radius of curvature at inside diameter 48. After insertion of male connector 46 into female connector 44, a latch 58 is used to retain male connector 46 in place within female connector 44. In the embodiment shown in FIG. 2, latch 58 is a common over-center style latch.

Referring now to FIGS. 4 and 5, there is shown another embodiment of a fluid line connection 60 of the present invention. Fluid line connection 60 is similar to fluid line connection 42 in that it includes a female connector 62 and a male connector 64. Female connector 62 likewise includes an ID 66 with an annular groove 68, and a seal 70 disposed within annular groove 68. Male connector 64 has an OD 72 which seals with seal 70. Fluid line connection 60 differs from fluid line connection 42 in the type of latch that is used to hold female connector 62 and male connector 64 together. More particularly, fluid line connection 60 includes a bayonet-style latch 74 with a pair of radially extending tabs 76 positioned on opposite sides of male connector 64. Tabs 76 are received within L-shaped slots 78 formed in ID 66 of female connector 62. When tabs 76 are at the bottom of mating L-shaped slots 78, male connector 64 is rotated to latch fluid line connection 60 together. This type of bayonet-style latch 74 also allows for a limited degree of rotation between female connector 62 and male connector 64 during operation.

During use, tilling implement 14 is backed up to air cart 12 and mechanically hitched together. Fluid line connections 42, 60 between mating air lines 36, 38 are made by inserting male connectors 46, 64 into respective female connectors 44, 62. Each fluid line connection 42, 60 is then latched together using a suitable latch. Other appropriate connections are also made between tilling implement 14 and air cart 12, such as hydraulic and/or electrical connections. Air seeder 10 may then be used to deposit material into the trenches formed by tilling implement 14.

Fluid line connections 42, 60 are quick and easy to use, and provide an effective seal at the connection points between the mating air lines associated with tilling implement 14 and the air lines associated with air cart 12. Fluid line connections 42, 60 may be placed at any desirable location on air cart 12 and/or tilling implement 14 allowing easy approach and use by an operator.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:
1. An agricultural air seeder, comprising:
a tilling implement including a plurality of air lines;
an air cart coupled with said tilling implement, said air cart including a pneumatic distribution system with a plurality of air lines; and
a plurality of air line connections, each said air line connection interconnecting between An air line associated with said tilling implement and an air line associated with said air cart, each said air line connection having a female connector and a male connector, said female connector having an inside diameter with an annular groove and a separate and discrete seal disposed within said annular groove, said male connector being positioned within said female connector and sealed with said seal.

2. The agricultural air seeder of claim 1, wherein each said female connector is carried by said air cart, and each said male connector is an end of a corresponding said air line associated with said tilling implement.

3. The agricultural air seeder of claim 1, wherein each said seal is one of: an O-ring seal; a seal with a U-shaped cross section; and a seal with a V-shaped cross section.

4. The agricultural air seeder of claim 1, wherein each said seal is an elastomeric seal.

5. The agricultural air seeder of claim 1, wherein each said annular groove is a rolled annular groove formed in a corresponding said female connector.

6. The agricultural air seeder of claim 1, wherein each said female connector includes a bell shaped entry end.

7. The agricultural air seeder of claim 1, wherein each said air line connection includes a latch between said female connector and a corresponding said air line.

8. The agricultural air seeder of claim 7, wherein each said latch is one of an over center-style latch and a bayonet-style latch.

\* \* \* \* \*